United States Patent
Nass et al.

(10) Patent No.: US 7,704,604 B2
(45) Date of Patent: Apr. 27, 2010

(54) SILICATE COATING AND METHOD OF COATING BY ACOUSTIC EXCITATION

(75) Inventors: Rüdiger Nass, Riegelsberg (DE); Detlef Burgard, Völklingen (DE); Christian Schnadinger, Rehlingen-Siersburg (DE)

(73) Assignee: Air Products and Chemicals, Inc., Allentown, PA (US)

( * ) Notice: Subject to any disclaimer, the term of this patent is extended or adjusted under 35 U.S.C. 154(b) by 288 days.

(21) Appl. No.: 11/575,241

(22) PCT Filed: Sep. 12, 2005

(86) PCT No.: PCT/EP2005/054527

§ 371 (c)(1),
(2), (4) Date: Jul. 25, 2007

(87) PCT Pub. No.: WO2006/030001

PCT Pub. Date: Mar. 23, 2006

(65) Prior Publication Data

US 2008/0096020 A1    Apr. 24, 2008

(30) Foreign Application Priority Data

Sep. 15, 2004 (DE) .................. 10 2004 045 038
Sep. 15, 2004 (DE) .................. 10 2004 051 644

(51) Int. Cl.
*B32B 5/16* (2006.01)
*B06B 1/00* (2006.01)
*B06B 1/20* (2006.01)

(52) U.S. Cl. ............... 428/404; 427/212; 427/215; 427/219; 427/457; 427/600

(58) Field of Classification Search .......... 428/403, 428/404; 427/212, 215, 219, 457, 600
See application file for complete search history.

(56) References Cited

U.S. PATENT DOCUMENTS

| | | | |
|---|---|---|---|
| 6,132,773 A | 10/2000 | Amiche | |
| 6,440,322 B1 | 8/2002 | Kim et al. | |
| 7,575,803 B2 * | 8/2009 | Hirai et al. | 428/402 |
| 2008/0096020 A1 * | 4/2008 | Nass et al. | 428/405 |

FOREIGN PATENT DOCUMENTS

| | | |
|---|---|---|
| DE | 69708085 | 3/1997 |
| DE | 19817286 | 10/1999 |
| DE | 10022037 | 11/2001 |
| DE | 69723347 | 4/2004 |
| EP | 0245984 | 11/1987 |
| EP | 0492223 | 7/1992 |
| EP | 0595471 | 5/1994 |
| EP | 0641842 | 3/1995 |
| EP | 0608388 | 7/1998 |
| EP | 1477465 | 11/2004 |
| JP | 2003246965 | 9/2003 |

* cited by examiner

*Primary Examiner*—H. (Holly) T Le
(74) *Attorney, Agent, or Firm*—Harness, Dickey & Pierce, PLC

(57) ABSTRACT

The invention relates to a method for forming a silicate coating on particles and to the particles thus obtained, characterized in that a solution containing silicate is added to a dispersion of uncoated particles having a diameter of less than 50 μm and acoustic excitation occurs.

15 Claims, No Drawings

SILICATE COATING AND METHOD OF COATING BY ACOUSTIC EXCITATION

FIELD

The present disclosure relates to a process for preparing a silicate coating on particles, and the particles thus obtained.

BACKGROUND

The statements in this section merely provide background information related to the present disclosure and may not constitute prior art.

A wide variety of coated particles are known. They are needed if a particle having particular properties, such as a given luminescence, absorption, color etc., lacks other properties, which are also needed, however. Thus, biological markers can be provided by particles which are particularly readily detected due to their luminescence and easily undergo binding with specific substances, such as enzymes or the like, due to the properties of their shell material. The shells are often organic, which limits applicability.

Also, in particular applications, only a few properties of particles are desired while other properties are disturbing. Thus, there are a wide variety of transparent IR absorbers which at the same time have a good electric conductivity ("transparent conductive oxides", TCO). Often, this conductivity is even retained when particles are incorporated in a matrix, such as a paint, which is the case even if the percolation limit is not reached. This is often undesirable, such as with glazing, because the two-dimensional application on glazing results in conductive surfaces, which adversely affects mobile phones, for example, in a building or house. In such cases, the TCOs or other substances are used as aggregates.

Aggregates, such as additives, fillers, pigments and the like, are required in a wide variety of applications. They confer particular properties, such as a particular desired optical behavior, to a matrix in which they are incorporated or to a larger body to which they adhere chemically or physically. It is important that while the aggregates must provide the desired properties, they must not have negative effects, such as with respect to the stability or biocompatibility or the biological safety and/or safety under food laws.

This is problematic especially when the aggregates cannot be incorporated firmly and at least essentially inaccessible in a matrix, and the material with which the aggregate is to be used additionally is exposed to changing and/or chemically aggressive environments. They may be exemplified by aggregates for fibrous materials, such as cotton. There are aggregates which must remain adhered to the cotton fibers even though the material is exposed to, for example, the acidic environment of transpiration and the like. The same applies to aggregates for, for example, paper fibers, cellulose and the like; there may be mentioned, for example, titanium oxide aggregates as whitening agents. Also problematic are aggregates, such as for printing and other inks, mainly if the printed matter frequently comes into contact with skin, because incorporation in printing inks is not particularly stable as a rule.

An aggregate with a high attractiveness because of its optical properties is indium tin oxide with an Sn content of 7±0.5 mole percent designated for printing in offset and inkjet printing processes. In order to render this material more attractive beyond its optical properties, it is required to prepare it in a biocompatible form. Here, "biocompatible" does not necessarily mean "safe in terms of food technology", but nevertheless in a form which renders the contact with such materials harmless in accordance with the definition below.

Problems in terms of production technology occur, in particular, when the biocompatibility of pigments to be printed is to be improved, or if pigments having an improved biocompatibility are to be prepared for use in printing without significantly influencing desired pigment properties, such as the particle size. Often, different production processes are required from pigment to pigment in order to obtain desired optical properties and printing properties with sufficient biocompatibility.

Relevant pigments include, for example, indium tin oxide with a tin content of 7±0.5 mole percent and a particle size of smaller than 10 μm. Efficient processes for producing such pigments in a biocompatible form are desirable.

There are a number of property rights which already deal with aggregates. There may be mentioned, for example, EP 0 492 223 A2 which relates to silanized pigments and their use for inhibiting the yellowing of pigmented plastic materials in which the increasing of the stability of pigment surfaces towards the action of air, oxygen, heat and light is addressed, and the chemisorption of silane compounds to pigments is mentioned, wherein the pigment coating is to be effected, in particular, without adding solvents or adding other substances, such as coupling agents or carrier liquids, in an intensive mixer. Further, there may be mentioned DE 198 17 286, which relates to a multilayered pearlescent pigment on the basis of an opaque substrate, wherein this application discusses, inter alia, the pigmenting of papers for bonds and securities and of packagings, as well as the laser marking of polymeric materials and papers; as metal oxides, there are mentioned $TiO_2$, $ZrO_2$, $Fe_2O_3$, $Fe_3O_4$, $Cr_2O_3$, ZnO, $(SnSb)O_2$, $Al_2O_3$, mixtures thereof, $SiO_2$.

In this specification, it is proposed to coat mica pigments having a particle size of from about 10 μm in such a way that they exhibit a particularly pronounced color flop, which means that the interference colors of the mica are to depend to a very high extent on the viewing angle. The use thereof in car paints is exemplified.

Further, there may be mentioned EP 0 608 388 B1, which discloses a plate-like pigment having a high luster and high opacity or high transparency, which is prepared in a particular way and provided with a matrix to achieve a luster. Surface-modified pigments in the form of titanium dioxide pigments and a layer of borates of alkaline earth metals and double borates of alkali and/or alkaline earth metals are disclosed in EP 0 641 842 B1. DE 697 23 347 relates to spherical $SiO_2$ particles having a size of from 5 to 500 nm and coated at individual points with metal oxide particles having a size of less than 60 nm.

In addition, DE 100 22 037 A1 relates to IR-absorbing compositions containing transparent thermoplastic polymers and surface-modified oxide particles having a particle size of less than 200 nm and organic near-infrared absorbers, as well as their preparation, use and products prepared therefrom.

EP 0 245 984 A1 describes the coating of $TiO_2$ particles with silicate. The addition of the silicate solution during the coating takes place at a pH value substantially above the isoelectric point of titanium oxide, without any input of additional energy. The pH value varies highly during the coating process. An uncontrollably rapid growth of the coating during the coating process and the coating of particle agglomerates cannot be prevented with this process, which is why the pigment formed must be comminuted again in a further step.

U.S. Pat. No. 6,440,322 B1 describes the coating of iron oxide particles with silicate. In this described process too, the pH value is not kept constant during the coating and lies far above pH 8 during the coating and is adjusted with hydrochloric acid to a pH of 8 after the reaction. No additional energy is input in this coating process either.

EP 1 477 465 A1 describes the coating of glass substrates with a coating material comprising particles of indium tin oxide and particles of silica. In the preparation of the coating material, the indium tin oxide particles are added without previous dissolution or dispersion to a mixture containing water glass and silica particles.

JP 2003-246965 describes the modification of particles of indium tin oxide with tetraethoxysilanes.

DE 697 08 085 T2 describes the coating of oxide particles with silicon dioxide, in which no additional energy input takes place and the coating occurs in a highly alkaline medium at a pH within a range of from 8 to 10. In this coating process, an additional electrolyte is further needed obligatorily. Since the coating takes place in a highly alkaline medium, an uncontrolled growth of the coating occurs. Therefore, the coated particles must be atomized after drying (cf. p. 8, 3rd paragraph).

SUMMARY

Since the previously known coating processes take place in a highly alkaline medium and agglomerate formation from the primary particles to be coated cannot be prevented, an uncontrolled growth of the silicate coating occurs during the coating process, or a coating of agglomerates of the primary particles rather than the primary particles themselves occurs in the previously known processes.

Thus, it is the object of the present invention to provide a process in which the coating can grow onto the particles uniformly and in a controlled way, and it is ensured that not agglomerates of the primary particles, but the primary particles themselves are coated to form particles (aggregates) with as high as possible a biocompatibility. A further object of the present invention is to produce a stable and reproducible change of the surface chemistry of primary particles which leads to increased chemical and mechanical stability.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

In a first embodiment, the object of the invention is achieved by a process for preparing a silicate coating on particles, characterized in that a silicate-containing solution is added with acoustic excitation to a dispersion of the uncoated particles having a diameter of smaller than 50 μm.

By the process according to the invention, the zeta potential of the primary particles can be easily adjusted, which results in an improved dispersibility and a uniform behavior in an electric field (for example, velocity in electrophoresis). Unlike organic coatings, the material is not softened during the electrophoresis.

By the acoustic excitation, for example, in the form of ultrasound, during the coating process, the particles to be coated are separated and any agglomerates of primary particles formed are broken up. Due to the fact that not agglomerates, but only the primary particles themselves are coated, the resulting coated particles are substantially more stable mechanically and chemically because coated agglomerates formed by "flocculation" or aggregate formation are easily broken up and can thus be attacked.

Further, by the process according to the invention and above all by the acoustic excitation during the coating process, grinding or atomizing after the drying of the coated product can be dispensed with. In the known processes, the agglomerated primary particles were always obligatorily coated in assembly as agglomerates. In this way, the surfaces of the primary particles were exposed again during the grinding, and thus the properties of the pigment obtained were critically altered. In contrast, in the process according to the invention, only the primary particles as such are coated due to the acoustic excitation. Even if the coated particles should be ground subsequently, while any agglomerates formed during the drying are broken up, the surfaces of the primary particles are not exposed. Thus, the properties of the coated particles are retained even after a possible grinding process.

Due to a silicate shell around a core material, its desired property can be essentially retained even though the surface properties and especially the chemical vulnerability are significantly changed.

Especially when the aggregate is supposed to have optical properties defined by the core material, it is possible to obtain such properties even through the silicate shell and irrespective thereof. This is true, in particular, if the aggregate is an aggregate or aggregate material that serves as an IR absorber, which is preferred.

This is true, in particular, if the aggregate is an aggregate or aggregate material that serves as an IR absorber or for luminescence, which is preferred. The electrical properties can be changed significantly by the process according to the invention. The particles prepared according to the invention are significantly more stable than uncoated particles. Thus, for example, titanium nitride particles can be obtained which are substantially more stable than untreated particles even in tropical or subtropical climates, which favors their use in solar screens. Moisture and/or oxidation affect the core-shell particles prepared according to the invention to a substantially lesser extent as compared to pure starting core particles.

The thus prepared core-shell particles can be employed in a wide variety of applications, for example, strong IR absorption and low conductivity as obtained with encapsulated TCOs, for coatings on glazing, as a starting material for markers because further layers, such as those of a substance employed for analytical purposes, can be applied without difficulty to the stable silicate shell, for colored coatings with materials which are otherwise applied only by sputtering because they are relatively unstable, etc. What is always advantageous here is at least one of the properties: good redispersibility, chemical stability and retention of essential optical properties of the core material. They also allow for storing the product as a starting material for further purposes, such as analytical purposes and/or in the semiconductor industry.

The aggregate materials of the present invention can be prepared, for example, from a nanoparticulate starting material by dispersing a nanoparticulate starting material in an aqueous medium while adjusting a pH which favors the dispersion, adding the sol-gel material which forms the silicate shell, and subjecting the reaction product obtained to a final thermal treatment as required.

It has been found that the thus prepared particles retain their optical properties required for printability, yet have a very good biocompatibility as compared to materials not prepared as described, especially as compared to uncoated indium tin oxide particles. A high biocompatibility is obtained in particular if the printed pigments are exposed to an acidic medium. The application of the prepared material can be effected later, such as by printing and/or spraying on, for example, by means of conventional printing techniques, such as continuous or discontinuous ink-jet printing methods, offset printing etc.

Thus, the product of the process according to the invention has the optical properties provided by the particulate core particles of the starting particles, has a high stability of the optical properties even under aggressive chemical conditions, and there are no recognizable biological risks involved in objects treated with the product of the process (for example, fibrous fabrics). This also holds for the use of the aggregate as a pigment in liquids to be sprayed on.

For example, in the process according to the invention, a dispersion of the particles can be prepared at first, a predefined pH for optimum dispersion be adjusted, and then the dispersion be heated to above room temperature. During the addition of the silicate solution (for example, as a sol-gel material), the system is acoustically excited, for example, by ultrasound. In the course of the coating reaction, a deposition of the silicate shell on the particles to be coated takes place. The reaction mixture can be stirred until the reaction is complete and/or thereafter, cooled down and separated off. The separation is effected, for example, by filtering. Thereafter, the filtered solid is subjected to a thermal aftertreatment, for example, in an oven, i.e., at a temperature which is below the sintering temperature of the silicate shell.

The aggregate obtained (pigment) has a fineness which is sufficient for printing. An examination of the particle size distribution indicates that a few coated agglomerates are present at most, which is particularly favorable in terms of printing technology. The aggregate is printed, for example, in liquids to be sprayed on in a continuous ink-jet printing process. The thus printed sheet-like fibrous fabrics are biocompatible and are found to be sufficiently acid-stable for many purposes.

In the process according to the invention, uncoated particles having an average diameter within a range of from 15 nm to 35 μm are advantageously employed. For large particles from about 10 μm, the process according to the invention has the critical advantage that such particles previously could be held in dispersion only with difficulty in the vicinity of the isoelectric point. For small particles having an average particle diameter of about 100 nm, the process according to the invention has the critical advantage that with known processes, mainly agglomerates of particles having sizes of this order could be coated because such particles agglomerate quite readily. With the process according to the invention, the agglomerates can be broken up to primary particles by the acoustic excitation immediately before the coating. Thus, for the first time, very small particles can also be reliably coated as primary particles.

If the particle size of the uncoated particles is substantially below this preferred range, the mass proportion of the coating of the coated particle as compared to the mass proportion of the uncoated particle comprises an increasingly large proportion so that the properties of the uncoated particle (for example, optical properties) can be retained less and less. If the particle size of the uncoated particles is clearly above the preferred range, it becomes increasingly difficult to keep the particles stably in dispersion under the conditions of the process according to the invention.

With the present invention, core-shell particles of different sizes can be prepared. Thus, core-shell particles having a size of several μm can be prepared, as can nanoparticulate core-shell particles. Thus, from suitable starting particle sizes, core-shell particles having a diameter of smaller than 0.5 μm can also be prepared.

The process may serve for the preparation of, for example, coated particulate indium tin oxide, especially with a diameter within a range of smaller than 10 μm without problems occurring. The process may also be applied to, for example, nanoparticulate ITO having a particle size of smaller than 1 μm, for example, for a particle size of 5 nm to several 100 nm (for example, 600 nm), as well as for particles having a size of a few μm. In particular, a stable and highly biocompatible substance is prepared.

In the case where the uncoated particles essentially consist of indium tin oxide, it may also be particularly advantageous if the average particle size is smaller than 1 μm, especially within a range of from 5 nm to 500 nm.

Advantageously, the thickness of the coating is within a range of from 10 to 100 nm, especially from 15 to 75 nm. This can ensure that the original properties (for example, optical properties) of the uncoated particles are essentially retained even in the coated state, and that a sufficient biocompatibility and mechanical and chemical stability can nevertheless be achieved.

The coated particles preferably have a diameter which is larger by 0.1 to 50% than the diameter of the uncoated particles.

As the core material, dispersible particles of suitable size can be used. However, preferred variants of the process are performed with a core material based on metal compounds, which is semiconductive. The core material itself may advantageously be at least selected from sulfides, nitrides, carbides, fluorides and/or oxides or mixed oxides of the heavy metals, especially of indium, arsenic, antimony, gallium and/or tin. For the core material, there may also be explicitly mentioned Cd, In, Sn, Ti, Zr, Si, Al and compounds thereof, for example, C, N or phosphate compounds, especially of Ti. There may be explicitly mentioned titanium carbides, titanium nitrides, titanium carbonitrides and the corresponding oxo compounds, especially titanium oxonitrides and titanium oxocarbonitrides, as well as the corresponding compounds of the other elements mentioned as well as tellurides, intermetallic compounds, arsenides and selenides and oxides. The use of agglomerates and mixtures of the mentioned compounds may be disclosed. Pyrophorous substances can also be handled with the process according to the invention.

More preferably, the core material may be essentially indium tin oxide, even more preferably with a tin content of 5±3 mole percent, and still more preferably of 7±0.5 mole percent.

The concentration in the original dispersion of the particles to be coated is preferably within a range of from 5 to 25% by weight. The observance of these concentration limits is particularly important since the application of the coating to the uncoated particles takes place in accordance with statistic laws. In principle, in the moment of metering the coating material, a sufficient proportion of particles to "accommodate the precipitating silica sol" must be present in the corresponding volume element of the dispersion of the particles to be coated. If the initial concentration is too low, there is a risk that crystal nuclei of pure silica gel are formed, which are then preferably coated. This would then result in an incomplete coating of the particles to be coated. In contrast, if the initial concentration of the dispersion of the particles to be coated is too high, a clear viscosity increase may occur during the process according to the invention due to the formation of "network structures", since the coated particles come too close to one another.

In the process according to the invention, an aqueous dispersion is first formed with the uncoated particles. As the solvent, in addition to water as the main component, other solvents, such as alcohols (for example, methanol, ethanol or isopropanol), ethers, alkanes or other solvents may be contained. However, it is particularly preferred to employ water as the solvent.

According to the invention, a solution containing silicate is added to the dispersion of uncoated particles. Advantageously, the silicate is an alkaline earth or alkali silicate, more preferably potassium or sodium silicate. The silicate employed in the process according to the invention may also be a mixture of these silicates. The concentration of the silicate solution employed in the process according to the invention is within a range of from 10 to 50% by weight. As the solvent for the potassium silicate solution, the same solvents as for the uncoated particles may be advantageously used, but independently of the solvent selected for the uncoated particles. Advantageously, the weight ratio of $SiO_2$ to the alkali or alkaline earth oxide in the silicate is within a range of from 1.2 to 2.2. If potassium silicate is employed as the silicate, the weight ratio of $SiO_2$ to $H_2O$ is preferably within a range of from 1.8 to 1.9.

Preferably, the cationic components of the silicate shell essentially have a size of at least above 0.095 nm. It has been found that the silicate shell does not adversely affect the desired properties of the aggregate material in such cases, and yet the shell is stable.

It is possible to provide for a sol-gel-based shell, i.e., in particular, a sol gel shell based on alkaline earth or alkali silicate.

The ratio of the volume of the dispersion of the uncoated particles to the volume of the silicate-containing solution is advantageously within a range of from 1 to 3.

Advantageously, during the addition of the silicate-containing solution, the pH value is adjusted to at least 2.5 and less than 8, especially at most 7, more preferably at most to a value which is 10% above the isoelectric point of the material to be coated. A pH value of less than 8 is advantageous because 100% precipitation of the silicate can thus be ensured. A pH value of at most 7 is advantageous because the coating process will be more effective and rapid then.

What is important during the addition of the silicate-containing solution is the acoustic excitation, especially by ultrasound. This is surprising since ultrasound is normally employed to separate material composites. However, in the process according to the invention, the coating material is to be bonded to the particle. The use of ultrasound in the process according to the invention has numerous advantages as compared to known processes. Thus, the use of acoustic excitation, such as ultrasound, has the effect that the coating does no longer grow uncontrollably onto the particles to be coated and becomes homogeneous. In the prior art coating processes, uncontrolled growth resulted in cauliflower-like structures on the surface or even the encapsulation of different primary particles with the coating material, so that the particles or particle agglomerates formed have had to be broken up after the coating to date (for example, by grinding or atomizing). However, with the process according to the invention, this is no longer necessary as set forth above. Even when the coated particles prepared according to the invention are ground, the properties of the coated particles are retained in contrast to the prior art.

Since the coating process according to the invention is performed at substantially lower pH values as compared to the prior art, the starting dispersions of the uncoated particles are mostly relatively unstable, especially for particles having diameters of more than 0.5 μm. By inputting acoustic excitation, those almost unstable dispersions can be dispersed completely at least temporarily, which prevents the coating of the agglomerates, and thus only primary particles are coated. The acoustic excitation, especially ultrasound, is advantageously employed in an intensity within a range of from 0.02 to 0.1 W/ml. If the intensity of the acoustic excitation is below this range, the agglomerates which may be present in the dispersion cannot be separated into primary particles. However, if the intensity is above this range, then the coating cannot be bonded to the primary particles sufficiently firmly.

During the addition of the silicate-containing solution, the pH value is advantageously kept constant by simultaneously adding acid. "Constant" within the meaning of the invention means that the pH value does not deviate by more than 0.1 from the initially adjusted pH value during the addition of the silicate-containing solution. Thus, a coating can be obtained which is particularly uniform and smooth as compared to the prior art without excessive "cauliflower" structures.

Advantageously, mineral acids or organic acids or mixtures thereof may be employed as the acids. Particularly preferred are mineral acids, such as hydrochloric acid, sulfuric acid, nitric acid, or organic acids, such as concentrated acetic acid. The aliquot concentration of the acid is advantageously within a range of from 0.05 to 2 mol/l.

The rate of adding the silicate-containing solution advantageously increases from the beginning of the addition to the end of the addition. Thus, at the beginning of the addition, silicate-containing solution is advantageously first added in an amount of from 0.5 to 1% by volume of the total silicate-containing solution per minute, while towards the end of the addition of the silicate-containing solution, from 1 to 2% by volume of the total silicate-containing solution per minute is advantageously added. If these conditions are not observed, defects or a non-uniform coating may easily result.

Advantageously, the temperature of the dispersion during the addition of the silicate-containing solution is adjusted within a range of from 50 to 95° C. If the temperature is below this range, an increase in viscosity ("gelling") may easily occur, which can considerably hinder the coating process. However, if the temperature is above this range, this may lead to an increase in viscosity due to substantial evaporation of the solvent.

Still more preferably, the starting concentration of the dispersion of the particles to be coated is within a range of from 7 to 20% by weight.

After completion of the addition of the silicate-containing solution, stirring of the resulting mixture can be advantageously continued for a period of 0.5 to 3 h under the same or different conditions.

After the addition of the silicate-containing solution or optionally after a subsequent stirring process, the solvent is separated off. This separation is advantageously effected by filtering, centrifuging, freeze-drying or spray-drying. Optionally, potassium and/or chloride ions are also separated off in this separation. For a better separation, the coated particles may also be agglomerated, for example, by adding flocculant or changing the pH value to the vicinity of the isoelectric point.

Subsequently, the separated solid is advantageously dried. This is effected at a temperature within a range of from 60 to 300° C., and at any rate at a temperature below the sintering temperature of the silicate employed. It is particularly preferred for the drying to take place at a temperature within a range of from 60 to 150° C. Such drying is advantageously performed in an oven or drying cabinet, preferably over a period of from 1 h to 18 h.

In particular, fibrous materials can be provided with the aggregate material. Said fibrous materials may be artificial fibers or fibrous materials on a natural, especially vegetable, base. There may be mentioned, in particular, the use with cotton fabrics where, for example, color effects can be brought about by applying aggregates, and/or a desired IR absorption, which may also be recurred to for testing the authenticity in the name brand clothes field without adversely affecting the visible design of the material. The same applies in the use of the aggregates used together with other fibrous materials, such as cellulose and typical cellulose-based materials, such as papers, especially those which must be biologically safe, for example, because they must be food safe, such as chewing gum papers, or currency notes or sanitary papers and utensils which may get into contact with human skin, especially if it is wet. In this case, the usability thereof in an acidic environment, in particular, may also have to be ensured. The application of the aggregate material may be effected during the production of fibrous material or later, for example, by printing and/or spraying on.

The particles are advantageously added to a fibrous plant material before it is processed into a fibrous sheet or fibrous fabric. The material thus obtained after the formation of the fibrous sheet has the optical properties as provided by the nanoparticulate core particles, has a high stability of the optical properties even under aggressive chemical conditions, and no recognizable biological hazards are associated with the fibrous fabric. The same applies for the use of the aggregate as a pigment in liquids to be sprayed on.

In a further embodiment, the object of the invention is achieved by particles with a silicate coating, especially those prepared by the above described process, which are characterized in that the silicate coating has a thickness within a range of from 5 to 75 nm, and the diameter of the coated particle is larger than the diameter of the uncoated particle by at most 50%.

Advantageously, the particles are made of indium tin oxide which has a tin content within a range of 7±0.5 mole percent. Due to the silicate coating, the indium tin oxide particles have a good biocompatibility.

EXAMPLES

Example 1

Coating of Nano-Sized Indium Tin Oxide with Silicate

In a 1000 ml beaker, 400 g of a (acid-stabilized) 10% by weight aqueous dispersion of commercially available ITO having a particle size of less than 50 μm was charged. The pH value was about 3.

The dispersion was heated to 75° C., and the temperature kept constant within ±2° C. This was followed by the continuous addition of 240 g of a diluted potassium silicate solution having a concentration of 185 g/l in the course of 95 min. The potassium silicate solution employed had an $SiO_2$:$K_2O$ weight ratio of 1.85:1 (±0.05).

Throughout the addition, the pH value was kept constant within ±0.1 by the simultaneous addition of an HCl solution with c=0.5 mol/l (aliquot concentration), and ultrasound was applied by means of an ultrasonic sonotrode of titanium directly at the site of addition with a power of 60 W.

After the addition was complete, the pH value was shifted to 5.5 by adding a 10% KOH solution until a clearly visible coagulation occurred. The dispersion was subjected to pressure filtration and washed. The filter cake was dried overnight at 60° C.

Comparative Example 1

Coating without Ultrasonic Application

By analogy with Example 1, the same process was performed without applying ultrasound.

Properties of the Powders:

Coated powder from Example 1

The coated nano-sized ITO had a stability of >95% over a period of 30 min towards a 5% HCl solution. In comparison, uncoated starting material had a stability of <25% under the same conditions.

After the application of suitable dispersing techniques, the following particle size distributions could be measured:

| Volume distribution | D50 | D90 | D99 |
|---|---|---|---|
| Starting material before the coating | 45 nm | 66 nm | 86 nm |
| Coated with silicate | 56 nm | 91 nm | 126 nm |

| Volume distribution | D50 | D90 | D99 |
|---|---|---|---|
| Starting material before the coating | 45 nm | 66 nm | 86 nm |
| Coated with silicate | 195 nm | 485 nm | 1126 nm |

Coated Powder from Comparative Example 1:

Without ultrasonic input: significant increase of the particle size distribution by the coating of agglomerates associated with a lower mechanical and chemical stability (larger "flocculations" and aggregate formations=leverage effect towards mechanical attacks). The coated nano-sized ITO had a stability of 25% over a period of 30 min towards a 5% HCl solution.

| Volume distribution | D50 | D90 | D99 |
|---|---|---|---|
| Starting material before the coating | 45 nm | 66 nm | 86 nm |
| Coated with $SiO_2$ | 195 nm | 485 nm | 1126 nm |

Example 2

Coating of Nano-Sized Zinc Oxide with Silicate

In a 1000 ml beaker, 400 g of a neutrally stabilized 10% aqueous ZnO dispersion having a particle size of less than 50 μm was charged. The pH value was about 7.

The dispersion was heated to 75° C., and the temperature kept constant within ±2° C. This was followed by the continuous addition of 240 g of a diluted potassium silicate solution having a concentration of 370 g/l in the course of 95 min. The potassium silicate solution employed had an $SiO_2$:$K_2O$ weight ratio of 1.85:1 (±0.05).

Throughout the addition, the pH value was kept constant within ±0.1 by the simultaneous addition of an HCl solution with c=1 mol/l (aliquot concentration), and ultrasound was applied by means of an ultrasonic sonotrode of titanium directly at the site of addition with a power of 60 W.

After the addition was complete, 100 g of solid potassium chloride was added for coagulation. The dispersion was subjected to pressure filtration and washed. The filter cake was dried at 300° C. for 2 hours.

Properties:

The coated nano-sized ZnO had a stability of >90% over a period of 30 min towards a 5% HCl solution. The corresponding uncoated ZnO powder showed a stability of <5%.

With suitable dispersing techniques, the following particle size distributions could be measured:

| Volume distribution | D50 | D90 | D99 |
|---|---|---|---|
| Starting material before the coating | 153 nm | 250 nm | 2300 nm |
| Coated with silicate | 170 nm | 280 nm | 2450 nm |

Example 3

Coating of Boron Nitride with Silicate

In a 1000 ml beaker, 450 g of a 10% aqueous dispersion of boron nitride having a particle size of less than 50 μm was charged. The pH value was about 8.

The dispersion was heated to 75° C., and the temperature kept constant within ±2° C. This was followed by the continuous addition of 200 g of a diluted potassium silicate solution having a concentration of 370 g/l in the course of 95 min. The potassium silicate solution employed had an $SiO_2$: $K_2O$ weight ratio of 1.85:1 (±0.05).

Throughout the addition, the pH value was kept constant within ±0.1 by the simultaneous addition of an HCl solution with c=1 mol/l (aliquot concentration), and ultrasound was applied by means of an ultrasonic sonotrode of titanium directly at the site of addition with a power of 60 W.

After the addition was complete, the dispersion was subjected to pressure filtration and washed. The filter cake was dried at 300° C. for 2 hours.

Properties:

With suitable dispersing techniques, the following particle size distributions could be measured:

| Volume distribution | D50 | D90 | D99 |
|---|---|---|---|
| Starting material before the coating | 2.89 μm | 6.10 μm | 9.17 μm |
| Coated with silicate | 2.78 μm | 5.97 μm | 9.20 μm |

A reduction of the ultrasound power input resulted in a significant increase of the particle size distribution associated with a lower mechanical and chemical stability (larger "flocculations" and aggregate formations=leverage effect towards mechanical attacks).

The present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A process for preparing a silicate coating on particles, characterized in that a silicate-containing solution is added with acoustic excitation to a dispersion of the uncoated particles having an average diameter of smaller than 50 μm, the process carried out at a pH-value in a range from about 2.5 to 7.

2. The process according to claim 1, characterized in that uncoated particles having an average diameter within a range of from 15 nm to 35 μm are coated.

3. The process according to claim 1, characterized in that during the addition of the silicate-containing solution, the pH value is adjusted to at most 10% above the isoelectric point of the material to be coated.

4. The process according to claim 1, characterized in that the pH value is kept essentially constant during the addition of the silicate-containing solution by simultaneously adding acid.

5. The process according to claim 1, characterized in that the temperature of the dispersion during the addition of the silicate-containing solution is adjusted within a range of from 50 to 95° C.

6. The process according to claim 1, characterized in that the starting concentration of the dispersion of the particles to be coated is adjusted within a range of from 5 to 25% by weight.

7. The process according to claim 6, characterized in that the starting concentration of the dispersion of the particles to be coated is adjusted within a preferred range of from 7 to 20% by weight.

8. The process of claim 1 wherein said acoustic excitation is ultrasound applied at an intensity of between 0.02 to 0.1 W/ml.

9. The process of claim 1 wherein the silicate containing solution is added to the dispersion with gradually increasing intensity.

10. Particles having an average diameter of smaller than 50 μm and comprising a silicate coating applied via a solution having a pH in the range of about 2.5 to 7, wherein the coating has a dry thickness of from 5 to 75 nm, and wherein the diameter of the coated particle is larger than the diameter of the uncoated particle by at most 50%.

11. The particles according to claim 10, characterized in that said particles consist of indium tin oxide with a tin content of 7±0.5 mole percent.

12. The particles of claim 10, characterized in that said particles consist of indium tin oxide with a tin content of 5±3 mole percent.

13. The particles according to claim 10 wherein said silicate coating includes silicates selected from the group of alkaline earth silicate; alkali silicates or mixtures thereof.

14. The particles according to claim 13 wherein said alkaline earth silicates include potassium silicate.

15. The particles according to claim 13 wherein said alkali silicates include sodium silicate.

* * * * *